(12) United States Patent
Jeffcoate et al.

(10) Patent No.: US 7,820,066 B2
(45) Date of Patent: Oct. 26, 2010

(54) FLUID COMPOSITION HAVING ENHANCED HEAT TRANSFER EFFICIENCY

(75) Inventors: Carol S. Jeffcoate, Long Beach, CA (US); Filipe J. Marinho, Danbury, CT (US); Aleksei V. Gershun, Southbury, CT (US)

(73) Assignee: Honeywell International Inc., Morristown, NJ (US)

( * ) Notice: Subject to any disclaimer, the term of this patent is extended or adjusted under 35 U.S.C. 154(b) by 37 days.

(21) Appl. No.: 10/863,477

(22) Filed: Jun. 8, 2004

(65) Prior Publication Data

US 2005/0269548 A1 Dec. 8, 2005

(51) Int. Cl.
*C09K 5/00* (2006.01)

(52) U.S. Cl. .......................... 252/71; 252/73; 252/78.1; 252/78.3

(58) Field of Classification Search .................... 252/71, 252/73, 78.3, 78.1
See application file for complete search history.

(56) References Cited

U.S. PATENT DOCUMENTS

| | | | | |
|---|---|---|---|---|
| 1,951,933 | A | * 3/1934 | Hochstetter | ................. 430/569 |
| 4,457,308 | A |   7/1984 | Golke et al. | ................. 128/399 |
| 5,595,679 | A | * 1/1997 | Zaid | ............................ 252/70 |
| 6,221,275 | B1 |   4/2001 | Choi et al. | .................... 252/74 |
| 6,432,320 | B1 | * 8/2002 | Bonsignore et al. | ........... 252/70 |
| 2003/0151030 | A1 | * 8/2003 | Gurin | ........................ 252/502 |

FOREIGN PATENT DOCUMENTS

| | | | |
|---|---|---|---|
| JP | 50051938 | * | 5/1975 |
| RU | 2091459 | * | 9/1997 |
| WO | WO 01/98431 A1 | | 12/2001 |

OTHER PUBLICATIONS

Maiga et al. Heat transfer behaviors of nanofluids in a uniformly heated tube. Superlattices and Microstructures 35 (2004) 543-557.*
The biocatalytic effect of Halobacterium halobium on photoelectrochemical hydrogen production. Journal of Biotechnology vol. 70, Issues 1-3, Apr. 30, 1999, pp. 115-124.*
XP-000961462, Measuring Thermal Conductivity of Fluids Containing Oxide Nanparticles, S. Lee, May 1999, pp. 280-289.
Heat Transfer Behaviours of Nanofluids in a Uniformly Heated Tube, Sidi El Becaye Maiga, May 12, 2003, pp. 544-557.
Anomalously Increased Effective Thermal Conductivities of Ethylene Glycol-Based Nanofluids Containing Copper Nanoparticles, J.A. Eastman, Feb. 5, 2001, pp. 718-720.
http://techtransfer.anl.gov/highlights/8-2/nanofluids.html Argone Technology Transfer Highlights, vol. 8, No. 2 (2 pages), 1997.
International Search Report for PCT/US2005/020034 dated Oct. 31, 2005 (5 pages).
International Written Opinion for PCT/US2005/020034 dated Mar. 9, 2006 (11 pages).
Method for Determining Ice Undercut Temperature of Deicing Chemicals, by Morris Mauritis, James McGraw and Ji-Won Jang, XP-002363148, Journal of Materials in Civil Engineering, vol. 7, No. 1, Feb. 1995, pp. 84-86.
"Method for Determining Ice Undercut Temperature of Deicing Chemicals" by Morris Mauritism, James McGraw, Ji-Won Jang, Journal of Materials in Civil Engineering, pp. 84-86, Feb. 1, 1995.
International Search Report dated Mar. 9, 2006 for PCT/US2005/020034, International Filing Date Jun. 8, 2005.

* cited by examiner

*Primary Examiner*—Lorna M Douyon
*Assistant Examiner*—Amina Khan
(74) *Attorney, Agent, or Firm*—Cantor Colburn LLP

(57) ABSTRACT

A fluid composition includes a coolant and a plurality of nanoparticles dispersed within the coolant. The plurality of nanoparticles includes glass, silica, pumices, metal compounds adapted to react with chloride in the coolant, and/or mixtures thereof. The plurality of nanoparticles substantially increases heat capacity of the coolant and enhances heat transfer efficiency of the fluid composition.

15 Claims, No Drawings

FLUID COMPOSITION HAVING ENHANCED HEAT TRANSFER EFFICIENCY

BACKGROUND

The present invention relates generally to coolant additives, and more particularly to the addition of nanoparticles in coolants to enhance heat transfer efficiency.

Automotive cooling systems are generally designed with a small radiator, which acts as a type of heat exchanger. Radiators are designed to transfer heat from the hot coolant flowing through it to the air blown through it by a fan. Typically, the amount of heat transferred to the radiator tubes from the fluid depends on the difference in temperature between the tube and the fluid touching it. Therefore, if the fluid that is in contact with the tube cools down quickly, less heat will be transferred. While smaller radiators may aid in the improvement of automotive designs (such as the lowering of the front end of the vehicle), if small radiators are used and the fluid therein cools quickly, even less heat may be transferred due in part to the smaller size of the radiator tubes.

The maximization of heat transfer capability of a heat transfer system may be important to the overall performance of the vehicle in which the system is used. The heat capacity of the heat transfer fluid may impact the transfer efficiency of the fluid, which in turn may aid in the temperature control of the vehicle's powertrain.

SUMMARY

The present invention solves the drawbacks enumerated above by providing a fluid composition including a coolant and a plurality of nanoparticles dispersed within the coolant. The plurality of nanoparticles includes glass, silica, pumices, metal compounds adapted to react with chloride in the coolant, and/or mixtures thereof. The plurality of nanoparticles substantially increases heat capacity of the coolant, thus enhancing the fluid composition's heat transfer efficiency.

DETAILED DESCRIPTION OF THE EMBODIMENTS

The inventors have unexpectedly and fortuitously discovered that the addition of various nanoparticles to a coolant may advantageously increase the heat capacity of the coolant. Embodiments of the present invention are directed to a fluid composition and a method of making the same. In an embodiment, the fluid composition includes a coolant and a plurality of nanoparticles dispersed throughout the coolant. It is believed, without being bound to any theory, that the addition of the plurality of nanoparticles increases the heat capacity of the coolant, which in turn enhances the heat transfer efficiency of the fluid and the efficiency of the system in which the fluid composition is used.

It is contemplated that any suitable coolant may be used in the fluid composition according to embodiments of the present invention. For example, some suitable coolants include those having organic acid corrosion inhibiting agents therein (also known as "extended life" coolants/antifreeze), coolants having silicate corrosion inhibiting agents therein (also known as "conventional" coolants/antifreeze), and coolants based on a combination of silicate and organic acid corrosion inhibitors (also known as "hybrid" antifreeze/coolants).

A main component of all coolants is a liquid alcohol freezing point depressant. Suitable liquid alcohol freezing point depressants include any alcohol or heat transfer medium capable of use as a heat transfer fluid. Non-limitative examples of alcohols include methanol, ethanol, propanol, butanol, furfurol, tetrahydrofurfuryl, ethoxylated furfuryl, ethylene glycol, diethylene glycol, triethylene glycol, 1,2 propylene glycol, 1,3 propylene glycol, dipropylene glycol, butylene glycol, glycerol, monoethylether of glycerol, dimethyl ether of glycerol, sorbitol, 1,2,6-hexanetriol, trimethylolpropane, methoxyethanol, and/or mixtures thereof. In a non-limiting embodiment, the alcohol is a glycol. The glycol may be at least one of ethylene glycol, diethylene glycol, propylene glycol, glycerol, and/or mixtures thereof. Coolants may differ in the type(s) of corrosion inhibitors added to them. Conventional coolants may be based on silicate(s) as a primary corrosion inhibitor. Extended life coolants may include organic acid(s) as a primary corrosion inhibitor. Hybrid coolants may be based on a combination of components from conventional and/or extended life antifreeze/coolants. Non-limitative examples of such organic acids include, but are not limited to aliphatic and/or aromatic mono- and/or dicarboxylic acids such as 2-ethylhexanoic acid, benzoic acids, t-butyl benzoic acid, sebacic acids, nonanoic acids, dodecanoic acids, neodecanoic acids, and mixtures thereof.

Commercially available antifreeze/coolants generally include ethylene glycol, water and additional chemical components which may provide corrosion protection and/or other benefits for the particular heat exchange system(s) in which it is employed. Further, up to about 10% or higher of diethylene glycol may be present in the grade of ethylene glycol employed to manufacture commercial antifreeze/coolants. It is contemplated that a wide range of compositions may be used in conjunction with ethylene glycol-based antifreeze/coolants employed as heat exchange fluids for internal combustion engine cooling systems.

Representative commercially available ethylene glycol-based antifreeze/coolants are those containing silicone/silicate additives and/or various carboxylic acids as corrosion inhibitors. Other optional additives are typically employed in commercial antifreeze/coolants in minor amounts of less than about 50 wt. % based on the weight of the antifreeze/coolant. Examples of these additives include, but are not limited to corrosion inhibitors for aluminum or other metals in admixture with oils and/or hydrophobizing agents such as, for example, molybdates, mono and/or di-aliphatic acids, e.g., sebacates, carbonates, silicates, alkali metal nitrates, alkali metal nitrites, diisopropylamine nitrite, dicyclohexylamine nitrate, tolyltriazole, mercaptobenzothiazole, benzotriazole, zinc compounds, calcium compounds, phosphates, benzoates, and/or the like, and/or mixtures thereof.

Other optional additives that may be present in commercial antifreeze/coolants include, but are not limited to: wetting agents and surfactants such as, for example, ionic and/or non-ionic surfactants such as the poly(oxyalkylene) adducts of fatty alcohols; defoamers and/or lubricants such as polysiloxanes and polyoxyalkylene glycols; wear inhibitors, such as zinc dithiophosphates and zinc thiocarbamates; lubricants, such as silicone pump lubricants; and other ingredients suitable for antifreeze/coolants that do not adversely affect the antifreeze/coolant characteristics sought to be achieved by the end use of the antifreeze/coolant.

A method of making an embodiment of the fluid composition includes mixing a plurality of nanoparticles into the coolant. It is believed, without being bound to any theory, that the nanoparticles may hold more heat than the volume of liquid (e.g. coolant) that they replace.

The nanoparticles may be dispersed throughout the coolant in a substantially homogeneous or substantially non-homogeneous manner. Further, any suitable amount of nanoparticles may be added to the coolant as desired and/or required. In an embodiment, the nanoparticles are present in an amount ranging between about 0.1% and about 3%. It is contemplated that this relatively small concentration of nanoparticles advantageously keeps the nanoparticles suspended in solution while substantially increasing the heat transfer efficiency of the coolant. In a non-limiting example, about 1% of pumice is about the equivalent of a 10% increase in water content for heat transfer properties for the coolant to which the pumice is added.

It is contemplated that the nanoparticles are solid particles measured on the nanometer scale that may have any suitable size and/or shape. It is believed that larger particles may, in some instances, precipitate out with time and/or accumulate at the low point of a cooling system. In an embodiment, each of the nanoparticles has an average diameter of up to about 4000 nanometers. In a non-limiting embodiment, the nanoparticles have an average size ranging between about 1 nm and about 2000 nm. In a further embodiment, the nanoparticles have an average size ranging between about 5 nm and about 1500 nm. Still further, in a preferred embodiment, the nanoparticles have a size ranging between about 10 nm and about 1000 nm. The nanoparticle size may be influenced by a number of factors, including but not limited to availability, dispersion and settling characteristics, cost and/or performance effectiveness. The shapes of the nanoparticles may have the same geometry, a similar geometry, or a mix of geometries. Some non-limiting examples of these shapes include, but are not limited to spheres, cylinders, cubes, cones, and/or irregular shapes. In an embodiment, the nanoparticles are in a powdered form.

The nanoparticles may be selected from at least one of glass, silica, pumice, metal compounds that may react to form insoluble metal compound (e.g. chloride) particles in situ, and/or mixtures thereof.

In an embodiment of the fluid composition including metal compounds (either alone or in addition to other nanoparticles) in a coolant containing chloride, the metal compounds generally have a tendency to act as a chloride scavenger. The metal compounds react with the free chloride in the coolant to form insoluble metal chloride particles in situ. It is to be understood that these insoluble metal chloride particles may (in addition to other added nanoparticles, if any) advantageously substantially improve the heat transfer capacity of the coolant. In an embodiment, the ratio of metal compounds to coolant is about 0.001 to 1.0.

In a non-limiting example of forming insoluble metal compounds (e.g. chlorides) in situ, the metal compounds are silver compounds, including but not limited to silver nitrate and the like. The silver acts as the scavenger, and the free chloride in the coolant (whose presence creates a danger of pitting corrosion for aluminum) interacts with the silver to form insoluble silver chloride in situ.

It is to be understood that a variety of other components may be added to the fluid composition. Examples of such additives include, but are not limited to corrosion inhibitors (discussed hereinabove), dispersion/passivating agents, and/or stabilization agents.

One such dispersion/passivating, and/or stabilizing additive is a substance that has hydrophilic characteristics and has particle bond forming characteristics (e.g. a sol gel compound that forms Si-particle bonds at one end and is hydrophilic at the other end) to aid in keeping the nanoparticles in suspension. Another example of a suitable stabilizing additive is a micelle-forming compound (e.g. soap) that traps the nanoparticle inside, thereby substantially preventing it from forming aggregates with other particles. Some non-limiting examples of highly aqueous thickening and stabilizing compounds also include alkali-soluble acrylic polymers when neutralized to a pH above 7, specially modified crosslinked polyacrylic acid polymers, water soluble polymers, and/or mixtures thereof. Specific non-limiting examples of these additives are commercially available under the tradenames ACUSOL 820 from ROHM and HAAS located in Philadelphia, Pa.; CARBOPOL ETD-2623 polymers from BF Goodrich located in Charlotte, N.C.; and CELLOSIZE Hydroxyethyl Cellulose with different molecular weights (QP-15000H, QP-30000H, and/or QP-52000H) from DOW located in Midland, Mich.

It is to be understood that the corrosion inhibitors may be selected from any suitable corrosion inhibitor or mixture of corrosion inhibitors which aid in prevention of corrosion of one or more metals, and is compatible with both conventional and extended life coolants. Some non-limiting examples of suitable conventional and extended life coolant formulation corrosion inhibitor(s) include alkali metal nitrates, phosphates, silicates, borates, nitrites, organic acids (non-limitative examples of which include 2-ethylhexanoic acid, benzoic acids, t-butyl benzoic acids, sebacic acids, nonanoic acids, dodecanoic acids, neodecanoic acids, and/or mixtures thereof), azoles, and/or modified azoles, and/or mixtures thereof. Further, one or more of these corrosion inhibitors may be present in an amount sufficient to provide a measurable amount of corrosion inhibition with respect to the metal (e.g., copper, steel, brass, aluminum and aluminum alloys, cast iron, solder and solder alloys, etc.) surfaces to be protected.

Other optional additives may be present in the fluid composition according to embodiments of the present invention. These optional additives include, but are not limited to wetting agents and surfactants such as, for example, ionic and non-ionic surfactants such as the poly(oxyalkylene) adducts of fatty alcohols; defoamers and/or lubricants such as polysiloxanes and polyoxyalkylene glycols; wear inhibitors, such as zinc dithiophosphates and zinc thiocarbamates; lubricants, such as silicone pump lubricants; and other suitable ingredients that do not adversely affect the characteristics sought to be achieved by the end use of embodiments of the fluid composition.

The additives may be added in a desired and/or required amount, depending on the desired and/or required characteristics of the final composition. In an embodiment, the amount of the additive material is less than about 1%.

To further illustrate the fluid composition disclosed herein, reference is made to the following examples. The examples are for illustrative purposes and are not intended to limit the scope of embodiment(s) of the present invention.

EXAMPLES

To make embodiment(s) of the fluid composition described hereinabove, 99 ml of antifreeze/coolant solution containing a 50% inhibited ethylene glycol and 50% water mixture was placed in a graduated cylinder. The nanoparticles, one example of which is pumice powder, were added to the graduated cylinder until 100 mls of solution was made. Another fluid composition without the nanoparticles was made for comparative purposes. Ten different cooling compositions were prepared (Examples 1-10). The components of these compositions are described in Tables 1a/1b below. Examples 1-3 are used as control compositions.

TABLE 1a

| Weight, %/particle size. Nm | Example 1 | Example 2 | Example 3 | Example 4 | Example 5 | Example 6 | Example 7 |
|---|---|---|---|---|---|---|---|
| ANTIFREEZE/COOLANT CONCENTRATE | 40 | 50 | 60 | 50 | 50 | 50 | 50 |
| PUMICE | — | — | — | — | — | 1/(1000) | 1/(1000) with stabilizer |
| $TIO_2$ | — | — | — | — | — | — | — |
| SILVER NITRATE | — | — | — | 0.25 | 0.1 | — | — |
| CHLORIDE | — | — | — | — | 50 ppm | — | — |
| SILICA | — | — | — | — | — | — | — |

TABLE 1b

| Weight, %/particle size. nm | Example 8 | Example 9 | Example 10 |
|---|---|---|---|
| ANTIFREEZE/COOLANT CONCENTRATE | 50 | 50 | 50 |
| PUMICE | — | — | — |
| $TIO_2$ | — | 1/4000 nm | 1/25-80 nm |
| SILVER NITRATE | — | — | — |
| CHLORIDE | — | — | — |
| SILICA | 1/no stabilizer | — | — |

After preparation, the compositions were evaluated and analyzed for heat transfer capabilities determined by calculation of the coefficient of critical cooling effectiveness (æ, %). The results are presented below in Table 2.

TABLE 2

| Example No. | $m_{original}$ | $m_{final}$ | Critical Cooling Effectiveness (CCE), % |
|---|---|---|---|
| 1 | −0.42 | — | — |
| 2 | −0.47 | — | — |
| 3 | −0.48 | — | — |
| 4 | −0.47 | −0.46 | 2.1 |
| 5 | −0.47 | −0.40 | 14.8 |
| 6 | −0.47 | −0.44 | 6.4 |
| 7 | −0.47 | −0.41 | 12.7 |
| 8 | −0.47 | −0.46 | 2.1 |
| 9 | −0.47 | −0.462 | 1.7 |
| 10 | −0.47 | −0.42 | 10.6 |

Heat Transfer Capabilities Determination Test

A novel method for evaluating effectiveness of heat transfer capabilities is described herein. This method is a fast, reproducible and inexpensive way to evaluate the heat transfer capabilities of different heat transfer antifreeze/coolants.

In general, the heat transfer capabilities method includes determining the coefficient of critical cooling effectiveness (CCE, %). Under the heat transfer capabilities determination test, a coefficient of critical cooling effectiveness having a value greater than about 0% is generally the lowest passing value of an effective test composition according to embodiments of the present invention. It is to be understood that the higher the CCE, the better heat transfer capability the fluid composition has. It is to be further understood that the CCE should be high enough such that heat transfer capability of the fluid composition is increased (over coolant compositions not including the novel nanoparticle additives according to embodiments of the present invention) and low enough such that there is substantially no detrimental effect on other coolant properties (e.g. ability to pass through small passages in a heat exchanger, reducing/increasing the boiling point, accumulation on heat rejected surfaces, etc.). In an embodiment, the CCE ranges between about 0% and about 15%. In another embodiment, the CCE ranges between about 2% and about 11%.

Calculation of Coefficient of Critical Cooling Effectiveness (CCE, %).

To determine the effectiveness of different coolant formulations with and without nanoparticles, CCE (%) was established for each formulation. The antifreeze/coolant solutions (those prepared with nanoparticles as previously described and those without nanoparticles) were diluted with water to concentrations ranging between about 40% and about 60%. After the samples were prepared, the slope of cooling was determined using the modified ASTM D 1177 test "$m_{original}$" (slope of coolant without nanoparticles), and "$m_{final}$" (slope of coolant with nanoparticles). The Coefficient of Critical Cooling Effectiveness (CCE, %) was calculated using the formula: $[(m_{original}-m_{final})/m_{original}]*100\%$.

While preferred embodiments of the invention have been described in detail, it will be apparent to those skilled in the art that the disclosed embodiments may be modified. Therefore, the foregoing description is to be considered exemplary rather than limiting.

What is claimed is:

1. A fluid composition, comprising:
    a coolant comprising
    a liquid alcohol freezing point depressant comprising a glycol; and
    a corrosion inhibitor selected from the group consisting of organic acid corrosion inhibiting agents, silicate corrosion inhibiting agents, and combinations thereof; said corrosion inhibitor being present in an amount sufficient to provide corrosion inhibition to metal surfaces in contact with the coolant; and
    nanoparticles dispersed throughout the coolant, the nanoparticles selected from the group consisting of glass, pumices, particles formed in situ from metal compounds that react with chloride, and mixtures thereof;
    wherein the nanoparticles increase the heat capacity of the coolant and enhance the heat transfer efficiency of the fluid composition.

2. The fluid composition as defined in claim 1 wherein the nanoparticles have an average diameter of about 1 nm to about 4000 nm.

3. The fluid composition as defined in claim 1, further comprising an additive dispersed within the composition.

4. The fluid composition as defined in claim 3 wherein the additive comprises at least one of corrosion inhibitors, dispersion agents, passivating agents, stabilization agents, and mixtures thereof.

5. The fluid composition as defined in claim 1 wherein the metal compounds comprise silver compounds that react with chloride to form insoluble silver chloride.

6. The fluid composition as defined in claim 5 wherein the silver compounds comprise silver nitrate.

7. The fluid composition as defined in claim 1 wherein the nanoparticles are substantially homogeneously dispersed throughout the coolant.

8. The fluid composition as defined in claim 1 wherein the nanoparticles hold more heat per volume than the coolant.

9. The fluid composition as defined in claim 1 wherein the nanoparticles are present in the fluid composition in an amount of about 0.1% to about 3%.

10. The fluid composition as defined in claim 1 wherein the coolant is at least one of a conventional coolant and an extended life coolant, and wherein the glycol is at least one of ethylene glycol, diethylene glycol, triethylene glycol, 1,2 propylene glycol, 1,3 propylene glycol, dipropylene glycol, butylene glycol or mixtures thereof and wherein the coolant further comprises at least one of methanol, ethanol, propanol, butanol, furfurol, tetrahydrofurfuryl, ethoxylated furfuryl, glycerol, monoethylether of glycerol, dimethyl ether of glycerol, sorbitol, 1,2,6 hexanetriol, trimethylolpropane, methoxyethanol, and mixtures thereof.

11. A method of making a fluid composition, comprising the step of:
    mixing nanoparticles with a coolant, the coolant comprising
    a liquid alcohol freezing point depressant; and
    a corrosion inhibitor selected from the group consisting of organic acid corrosion inhibiting agents, silicate corrosion inhibiting agents, and combinations thereof; said corrosion inhibitor being present in an amount sufficient to provide corrosion inhibition to metal surfaces in contact with the coolant;
    the nanoparticles selected from the group consisting of glass, pumice, and mixtures thereof;
    wherein the nanoparticles enhance the heat capacity of the coolant and increase the heat transfer efficiency of the fluid.

12. The method as defined in claim 11, further comprising the step of adding an additive capable of stabilizing the nanoparticles in the fluid.

13. The method as defined in claim 11 wherein the coolant is at least one of a conventional coolant and an extended life coolant, and wherein the liquid alcohol freezing point depressant is at least one of methanol, ethanol, propanol, butanol, furfurol, tetrahydrofurfuryl, ethoxylated furfuryl, ethylene glycol, diethylene glycol, triethylene glycol, 1,2 propylene glycol, 1,3 propylene glycol, dipropylene glycol, butylene glycol, glycerol, monoethylether of glycerol, dimethyl ether of glycerol, sorbitol, 1,2,6-hexanetriol, trimethylolpropane, methoxyethanol, or mixtures thereof.

14. A method of making a fluid composition, comprising the step of:
    mixing a metal compound with a coolant, the coolant comprising
    a liquid alcohol freezing point depressant comprising a glycol;
    a corrosion inhibitor selected from the group consisting of organic acid corrosion inhibiting agents, silicate corrosion inhibiting agents, and combinations thereof; said corrosion inhibitor being present in an amount sufficient to provide corrosion inhibition to metal surfaces in contact with the coolant; and
    chloride, wherein the metal compound reacts with chloride to form insoluble metal chloride nanoparticles.

15. The method as defined in claim 14 wherein the coolant is at least one of a conventional coolant and an extended life coolant, and wherein the glycol is at least one of ethylene glycol, diethylene glycol, triethylene glycol, 1,2 propylene glycol, 1,3 propylene glycol, dipropylene glycol, butylene glycol or mixtures thereof and wherein the coolant further comprises at least one of methanol, ethanol, propanol, butanol, furfurol, tetrahydrofurfuryl, ethoxylated furfuryl, glycerol, monoethylether of glycerol, dimethyl ether of glycerol, sorbitol, 1,2,6 hexanetriol, trimethylolpropane, methoxyethanol, and mixtures thereof.

* * * * *